(12) United States Patent
Cole et al.

(10) Patent No.: US 6,348,874 B1
(45) Date of Patent: *Feb. 19, 2002

(54) POWER DISTRIBUTION TO NODES IN A DISTRIBUTED SYSTEM

(75) Inventors: Wesley D. Cole, Palo Alto; Hans J. Sitte, San Jose, both of CA (US); Mutsuya Ii, Shoreline, WA (US); John C. Eidson, Palo Alto, CA (US)

(73) Assignee: Agilent Technologies, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,525

(22) Filed: Oct. 14, 1998

(51) Int. Cl.[7] .................................................. H04L 1/00
(52) U.S. Cl. .................. 340/825.01; 370/238; 370/404; 370/445; 370/446; 370/524
(58) Field of Search ...................... 340/825.01; 370/445, 370/446, 404, 524, 238

(56) References Cited

U.S. PATENT DOCUMENTS

| | | | | |
|---|---|---|---|---|
| 5,235,599 A | * | 8/1993 | Nishimura et al. | 340/825.01 |
| 5,414,708 A | * | 5/1995 | Webber et al. | 370/445 |
| 5,513,370 A | * | 4/1996 | Paul | 340/825.01 |
| 5,537,468 A | * | 7/1996 | Hartmann | 370/238 |
| 5,805,597 A | * | 9/1998 | Edem | 370/445 |
| 5,933,590 A | * | 8/1999 | Allen | 340/825.01 |
| 5,995,353 A | * | 11/1999 | Cunningham et al. | 361/111 |

OTHER PUBLICATIONS

Explained: Worldwide Network and Applications Technology (Second Edition, John M. Griffiths), 1994.*

* cited by examiner

Primary Examiner—Brian Zimmerman
Assistant Examiner—Yves Dalencourt

(57) ABSTRACT

A system in which remote nodes are supplied with electrical power using existing network communication links. A communication device in a system according to the present techniques routes electrical power to a remote node via a set of unused lines of a network communication link used for communication with the remote node. The electrical power distributed to the remote node may be AC or DC power.

26 Claims, 4 Drawing Sheets

POWER DISTRIBUTION TO NODES IN A DISTRIBUTED SYSTEM

BACKGROUND OF THE INVENTION

1. Field of Invention

The present invention pertains to the field of distributed systems. More particularly, this invention relates to power distribution to nodes in a distributed system.

2. Art Background

Distributed systems such as distributed control systems are commonly arranged as a collection of nodes which are interconnected via one or more network communication links. The network communication links may be arranged using one or more intervening communication devices such as repeaters, switching hubs, or gateways. Nodes that are interconnected via network communication links may be referred to as remote nodes.

One prior method for providing electrical power to remote nodes is to route dedicated power lines throughout the distributed system to the remote nodes. Unfortunately, the routing of dedicated power lines usually increases the cost installing and maintaining a distributed system.

Another method for providing power to remote nodes is to provide each remote node with its own power supply such as a battery or a power supply driven by an AC power source. Unfortunately, providing each remote node with its own power supply usually increases the cost of each remote node and increases the overall cost of a distributed control system.

Another method for providing power to remote nodes is to superimpose the signaling required for communication with the remote nodes onto the conductors that supply power to the remote nodes. Unfortunately, such a method usually increases the cost of the remote nodes. In addition, such a method usually increases the complexity of the communication circuitry in the remote nodes and may limit performance.

SUMMARY OF THE INVENTION

A system is disclosed in which remote nodes are supplied with electrical power using existing network communication links. A communication device in a system according to the present techniques routes electrical power to a remote node via a set of unused lines of a network communication link used for communication with the remote node. The electrical power distributed to the remote nodes may be AC or DC power. The system routes electrical power to remote nodes via a set of lines in the same cable bundle as communication signal lines. This saves wiring costs and installation costs.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
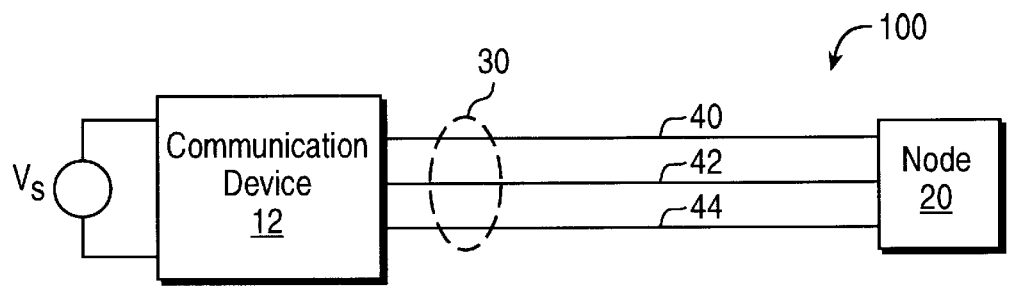
FIG. 1 shows a distributed system in which electrical power is routed to a remote node via previously unused lines of a network communication link which is also used for communication to the remote node.

FIG. 1 shows a distributed system 100 in which electrical power is routed to a remote node 20 via previously unused lines of a network communication link 30 which is also used for communication to the remote node 20. The distributed system 100 includes a communication device 12 that enables communication to the remote node 20 via the network communication link 30 and that includes mechanisms for distributing electrical power to the remote node 20.

The network communication link 30 conforms to a particular standard that includes a set of transmit data lines 40, a set of receive data lines 42, and a set of unused lines 44. The transmit data lines 40 and the receive data lines 42 are used for communication between the communication device 12 and the remote node 20. The communication device 12 uses lines 44 which are unused according to the particular standard to route power to the remote node 20.

The network communication link 30 may be any type of communication path that has unused signal lines which may be defined by an industry standard.

The lines 44 may be selected to replace a portion of the communication capability of the communication link 30. For example, the replaced capability may be full duplex transmission. This nevertheless yields the ability to power remote nodes while retaining substantially all of the communication capability of the communication link 30. For example, the capability of half duplex transmission may be retained. As another example, a 100 megahertz Ethernet line may be use to provide power as well as 10Base-T operation.

In one embodiment, the network communication link 30 is an Ethernet 10Base-T link in which lines 4,5 and 7,8 are normally unused lines according to the 10Base-T standard and are used as the lines 44 to supply power to the remote node 20. In another embodiment, the network communication link 30 is an Ethernet 10Base-T link in which two of its normally unused lines 4,5 and 7,8 are the lines 44 that are used to supply power to the remote node 20.

The use of all four of the lines 4,5 and 7,8 as the lines 44 may be preferable in that this would increase the current carrying capacity of the lines 44 and reduce the voltage drop of the lines 44 for long lengths of the network communication link 30.

For example, the lines 4,5 may be a common line while the lines 7,8 provide a voltage potential $V_n$ to the remote node 20. Similar alternative arrangements of the lines 4,5 and 7,8 may be used.

For embodiments in which the remote node 20 requires multiple supply voltages the lines 4,5 and 7,8 may be subdivided to carry multiple supply voltages. For example, lines 4,5 may be a common line while the line 7 carries a voltage potential $V_{n1}$ and the line 8 carries a voltage potential $V_{n2}$ to the remote node 20. Alternatively, the lines 4,5 and 7,8 may be used to carry a single voltage potential $V_n$ to the remote node 20 and circuitry may be provided in the remote node 20 for converting the voltage potential $V_n$ into the voltage levels $V_{n1}$ and $V_{n2}$ and possibly other levels depending on the needs of the remote node 20.

In one embodiment, the lines 44 are used to route DC power to the remote node 20. In another embodiment, the lines 44 are used to route AC power to the remote node 20.

The communication device 12 is powered by a voltage source $V_s$. In one embodiment, the voltage source $V_s$ is a DC voltage source. In another embodiment, the voltage source $V_s$ is an AC voltage source.

The remote node 20 may be any type of remote node in a distributed system. For example, the remote node 20 may be a sensor remote node or an actuator remote node or an application controller remote node or a remote node that is a combination of any of these in the distributed system 100. In addition, the remote node 20 may be a computer system such as a personal computer.

The communication device 12 may be any device capable of communication on the network communication link 30. The communication device 12 in one embodiment is a repeater which includes circuitry for receiving communication packets via the network communication link 30 and for retransmitting the communication packets via additional network communication links (not shown). In other embodiments, the communication device 12 may include circuitry for gateway functions or router or switching hub or similar functions. The communication device 12 may be a PC network card or a remote sensor or actuator or application controller remote node of the distributed system 100.

Figure 2:
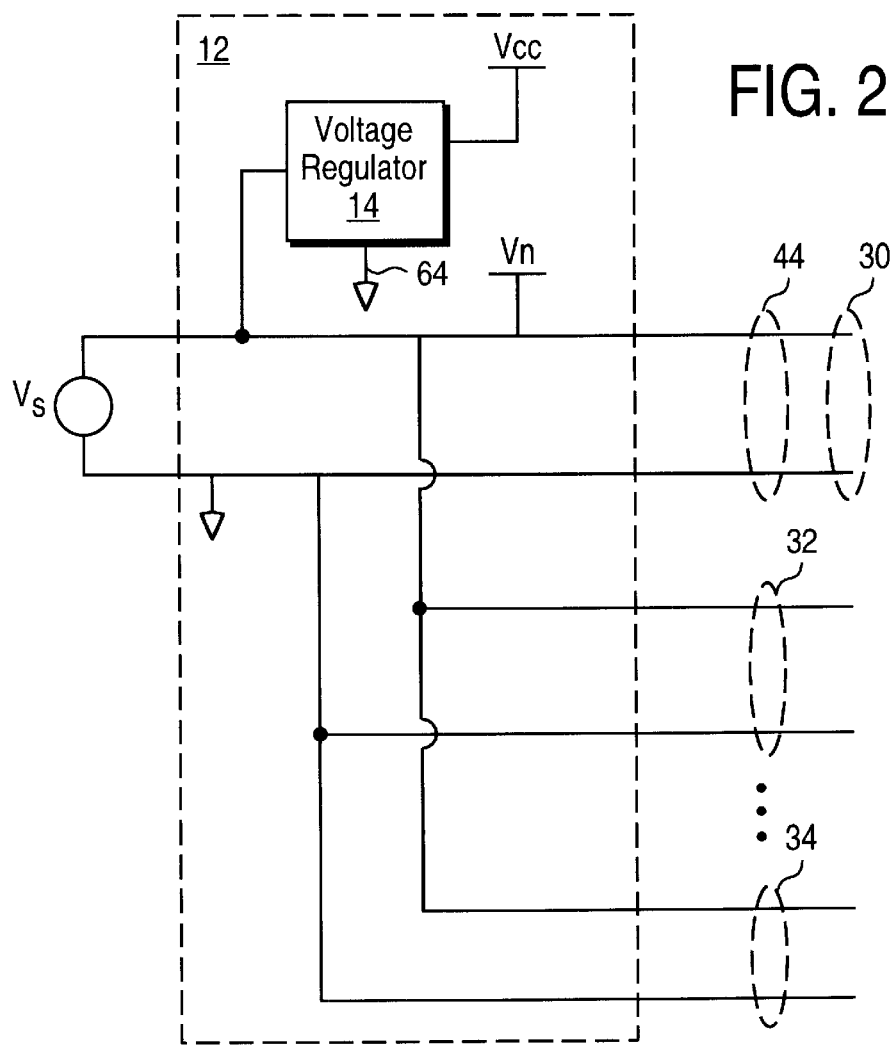
FIG. 2 illustrates one embodiment of a communication device which distributes power via communication links.

FIG. 2 illustrates one embodiment of the communication device 12. In this embodiment, the communication device 12 is a switching hub that provides communication among the network communication link 30 and a set of additional network communication links 32–34 and also distributes power to the remote nodes connected to the network communication links 30–34.

The communication device 12 is powered by a voltage source $V_s$. The voltage source $V_s$ may generate a DC voltage which is distributed as the voltage potential $V_n$ directly via the network communication links 30–34. A voltage regulator 14 uses the voltage source $V_s$ to provide a supply voltage $V_{cc}$ for application specific circuitry (not shown) in the communication device 12.

Alternatively, the voltage source $V_s$ may generate an AC voltage which is distributed directly via the network communication links 30–34 as the voltage potential $V_n$. In this alternative embodiment, the voltage regulator 14 is replaced by a power supply that transforms, rectifies, and filters the voltage source $V_s$ to provide the supply voltage $V_{cc}$.

Figure 3:
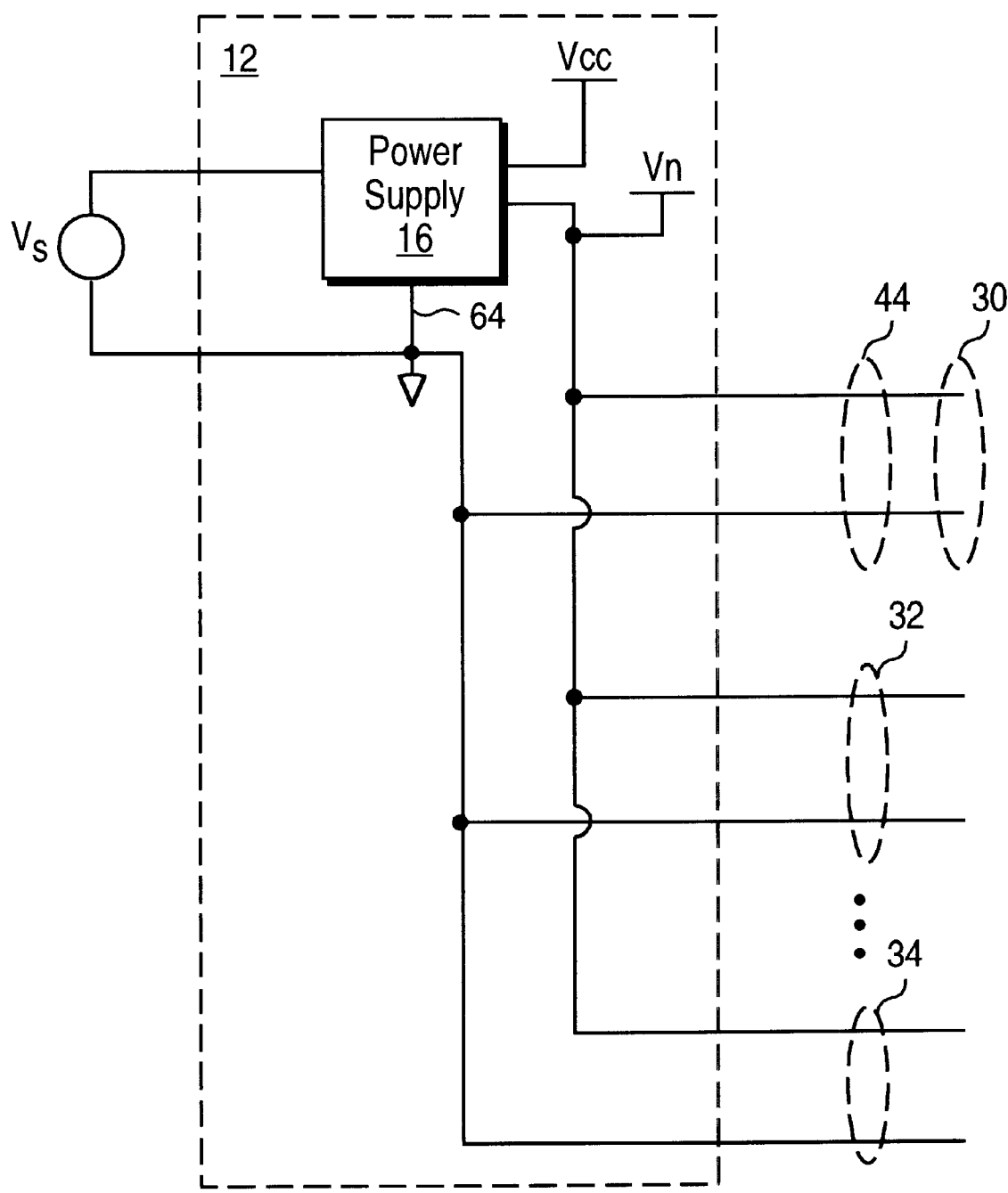
FIG. 3 illustrates another embodiment of a communication device which distributes power via communication links.

FIG. 3 illustrates another embodiment of the communication device 12 which is a switching hub that provides communication among the network communication links 30–34 and also distributes power to the remote nodes connected to the network communication links 30–34. In this embodiment, the voltage source $V_s$ generates an AC voltage which is transformed, rectified, and filtered by a power supply 16 to provide the supply voltage $V_{cc}$ for the circuitry in the communication device 12 and the voltage potential $V_n$ for distribution via the network communication links 30–34.

Figure 4:
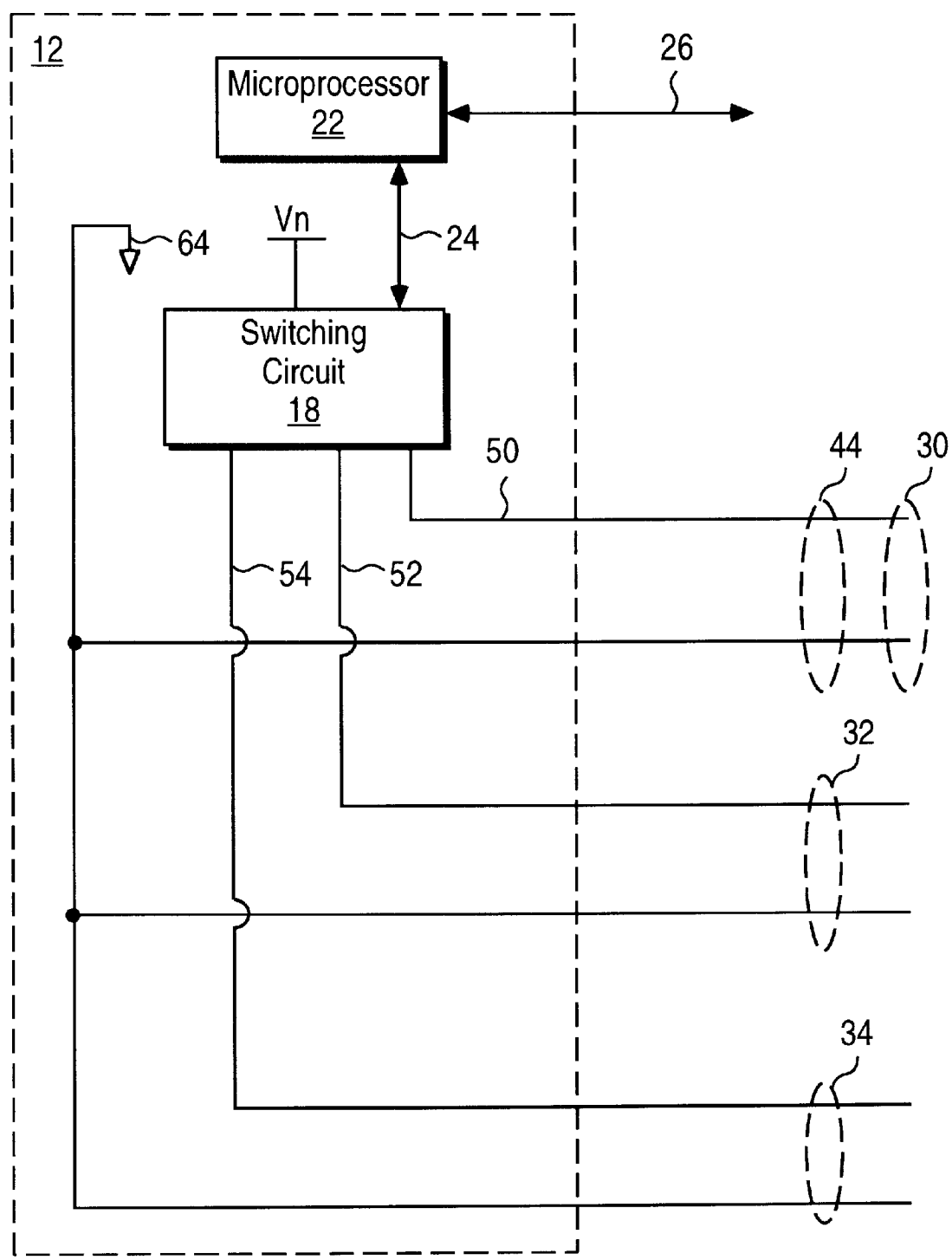
FIG. 4 illustrates yet another embodiment of a communication device which distributes power via communication links using a switching circuit.

FIG. 4 illustrates yet another embodiment of the communication device 12 which includes a switching circuit 18 that distributes the voltage potential $V_n$ to the remote nodes connected to the network communication links 30–34. The switching circuit 18 may include current limiting circuitry that prevents short circuits in the network communication links 30–34 or the remote nodes connected thereto from affecting the voltage potential $V_n$.

The switching circuit 18 may include circuitry for sensing short circuits on a set of power lines 50–54 that are connected to the unused lines of the network communication links 30–34. The communication device 12 includes a microprocessor 22 that obtains information regarding short circuits via a signal path 24. The microprocessor 22 may light LEDs (not shown) to indicate short circuits on the power lines 50–54. The microprocessor 22 may send a message via a communication path 26 to notify other elements of a system of the occurrence of short circuits on the power lines 50–54.

Figure 5:
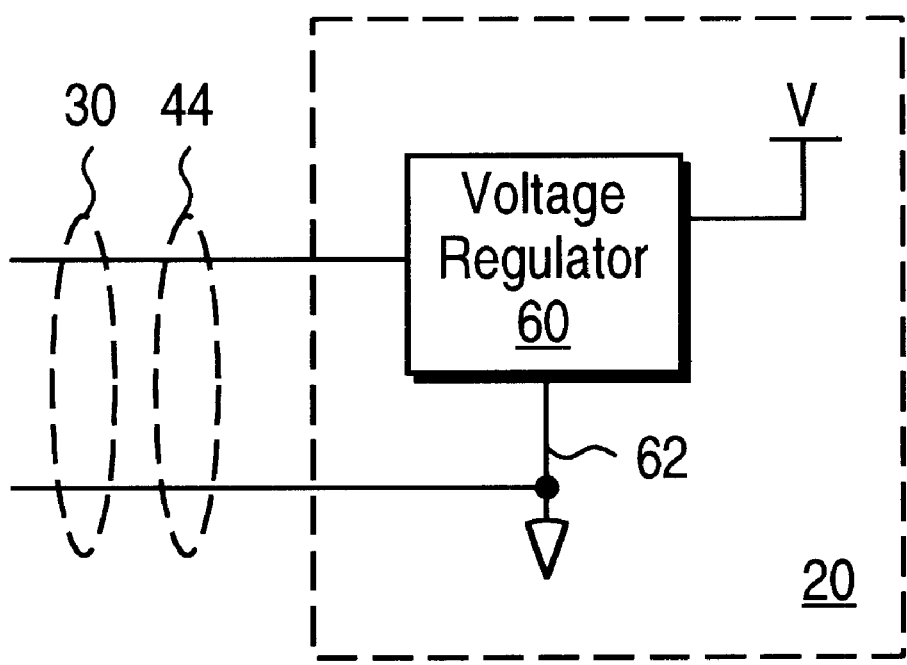
FIG. 5 shows one embodiment of a remote node which obtains a voltage potential $V_n$ via unused lines of a network communication link.

FIG. 5 shows one embodiment of the remote node 20 which obtains the voltage potential $V_n$ via the lines 44 of the network communication link 30. In an embodiment in which the voltage potential $V_n$ is DC, a voltage regulator 60 uses the voltage potential $V_n$ to provide a supply voltage V for application specific circuitry (not shown) in the remote node 20. In an embodiment in which the voltage potential $V_n$ is AC, the voltage regulator 60 is replaced by a power supply that transforms, rectifies, and filters the voltage potential $V_n$ to provide the supply voltage V.

In order to minimize to occurrence of ground loops between the communication device 12 and the remote node 20 via the lines 44 and an earth ground, it is preferable to maintain a high degree of isolation, such as 1500 V, between the common junctions in the communication device 12 and the remote node 20 and the earth ground. For example, a ground 62 for the circuitry in the remote node 20 is electrically isolated from the earth ground. The circuitry of the communication device 12 may be connected to earth ground to provide single point grounding of the system. If there is more than one communication device in the system then one may be connected to earth ground while the others may maintain a high degree of isolation from earth ground. If the earth ground is connected to the ground 62 then an isolating power supply having a transformer could be used in the remote node 20 to prevent ground loop currents.

The network communication link 30 may be embodied in a cable that contains as a set of electrical conductors that provide the lines 40–44. The electrical conductors may be surrounded by a shield layer which is connected to the earth ground. The shield layer may have an outer insulating layer with distinctive markings such as a particular color or colors that indicate that the cable carries electrical power as well as communication signals. The ends of the cables may have special connectors which are keyed to special receptacles on the communication device 12 and the remote node 20. This may be used to prevent, for example, conventional 10base-T remote nodes from being connected to powered 10base-T cables.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:

network communication link that conforms to an industry standard that specifies a set of data transmission lines and a set of unused lines;

communication device coupled to the network communication link, the communication device having circuitry for providing electrical power on the unused lines of the network communication link;

remote node coupled to the network communication link, the remote node having circuitry for obtaining electrical power from the unused lines of the network communication link;

circuitry for avoiding ground loops between the communication device and the remote node via an earth ground by maintaining a high degree of electrical isolation between a ground for circuitry in the communication device and the remote node and the earth ground.

2. The distributed system of claim 1, wherein the industry standard specifies a set of lines for full-duplex transmission and the communication device provides electrical power to the remote node via a subset of the lines allocated for full-duplex transmission.

3. The distributed system of claim 1, wherein the industry standard is a 10Base -T standard.

4. The distributed system of claim 1, further comprising circuitry for preventing a short circuit in the network communication link from affecting a voltage potential distributed on the unused lines.

5. The distributed system of claim 1, further comprising means for sensing a short circuit in the communication device and for transferring a message via a communication link that carries an indication of the short circuit.

6. The distributed system of claim 1, wherein the network communication link is contained in a cable with distinctive markings that indicate a powered network communication link.

7. The distributed system of claim 1, wherein the network communication link includes a pair of connectors which are keyed to a receptacle on the communication device and a receptacle on the remote node.

8. A communication device for a distributed system, comprising:

circuitry for providing electrical power on a set of unused lines of the network communication link of the distributed system wherein the network communication link conforms to an industry standard that specifies a set of data transmission lines and the unused lines;

circuitry for avoiding ground loops on the unused lines via an earth ground by maintaining a high degree of electrical isolation between a ground for circuitry in the communication device and the earth ground.

9. The communication device of claim 8, wherein the industry standard specifies a set of lines for full-duplex transmission and the communication device provides electrical power via a subset of the lines allocated for full-duplex transmission.

10. The communication device of claim 9, wherein the industry standard is a 10Base-T standard.

11. The communication device of claim 9, wherein the communication device is a repeater.

12. The communication device of claim 9, wherein the communication device is a router.

13. The communication device of claim 9, wherein the communication device is a switching hub.

14. The communication device of claim 9, wherein the communication device is a PC network card.

15. The communication device of claim 9, further comprising circuitry for preventing a short circuit in the network communication link from affecting a voltage potential distributed on the unused lines.

16. The communication device of claim 9, further comprising means for sensing a short circuit in the communication device and for transferring a message via a communication link that carries an indication of the short circuit.

17. The communication device of claim 9, further comprising a receptacle which is keyed to a connector of the network communication link.

18. A remote node for a distributed system, comprising:

circuitry for obtaining electrical power from a set of unused lines of the network communication link wherein the network communication link conforms to an industry standard that specifies a set of data transmission lines and the unused lines;

circuitry for avoiding ground loops on the unused lines via an earth ground by maintaining a high degree of electrical isolation between a ground for circuitry in the remote node and the earth ground.

19. The remote nod e of claim 18, wherein the industry standard specifies a set of lines for full-duplex transmission and the remote node obtains electrical power via a subset of the lines allocated for full-duplex transmission.

20. The remote node of claim 19, wherein the industry standard is a 10Base-T standard.

21. The remote node of claim 19, wherein the remote node is a sensor node.

22. The remote node of claim 19, wherein the remote node is an actuator node.

23. The remote node of claim 19, wherein the remote node is an application controller node.

24. The remote node of claim 19, wherein the remote node is a computer system.

25. The remote node of claim 19, further comprising an isolating power supply with transformer for preventing ground loops.

26. The remote node of claim 19, further comprising a receptacle which is keyed to a connector of the network communication link.

* * * * *